(12) United States Patent
Mukai et al.

(10) Patent No.: US 10,504,370 B2
(45) Date of Patent: Dec. 10, 2019

(54) COLLISION AVOIDANCE APPARATUS, COLLISION AVOIDANCE SYSTEM, AND DRIVING SUPPORT METHOD

(71) Applicant: DENSO CORPORATION, Kariya, Aichi pref. (JP)

(72) Inventors: Yasuhiko Mukai, Kariya (JP); Masanobu Yamaguchi, Kariya (JP); Takeshi Miura, Kariya (JP); Hiroaki Ohshima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 86 days.

(21) Appl. No.: 15/562,866

(22) PCT Filed: Mar. 25, 2016

(86) PCT No.: PCT/JP2016/059700
§ 371 (c)(1),
(2) Date: Sep. 28, 2017

(87) PCT Pub. No.: WO2016/158786
PCT Pub. Date: Oct. 6, 2016

(65) Prior Publication Data
US 2018/0114443 A1 Apr. 26, 2018

(30) Foreign Application Priority Data
Apr. 2, 2015 (JP) .................................. 2015-075828

(51) Int. Cl.
*G08G 1/16* (2006.01)
(52) U.S. Cl.
CPC ............. *G08G 1/166* (2013.01); *G08G 1/161* (2013.01); *G08G 1/164* (2013.01)

(58) Field of Classification Search
CPC ........ G08G 1/161; G08G 1/164; G08G 1/166; G08G 1/163; B60W 50/0097;
(Continued)

(56) References Cited

U.S. PATENT DOCUMENTS 6,338,022 B1 * 1/2002 Shinmura .............. B62D 6/003
701/301
6,571,176 B1 * 5/2003 Shinmura ................. B60T 7/22
180/421
(Continued)

FOREIGN PATENT DOCUMENTS

JP 2008-065480 A 3/2008
JP 2008224361 A 9/2008
(Continued)

*Primary Examiner* — Mussa A Shaawat
(74) *Attorney, Agent, or Firm* — Knobbe, Martens, Olson & Bear, LLP

(57) ABSTRACT

In a collision avoidance apparatus (1), a first information acquisition unit (7) generates first information that includes the position, speed and advancement direction of a first mobile body, and obtains first information from a first information transmitting unit (1) having a transmitting function. A second information acquisition unit (9) obtains second information that includes the position, speed and advancement direction of a second mobile body. A first mobile body prediction unit (11) predicts positions ($P_1$) of the first mobile body at future time points T, based on the first information, and a second mobile body prediction unit (13) predicts the positions ($P_2$) of the second mobile body at the time points T, based on the second information. A judgement unit (15) judges whether or not the positions ($P_1$) of the first mobile body and the positions ($P_2$) of the second mobile body satisfy predetermined conditions, and if the conditions are satisfied, a signal outputting unit (17) outputs a signal which is specific to that case.

11 Claims, 7 Drawing Sheets

(58) Field of Classification Search
CPC ......... B60W 30/0953; B60W 30/0956; B60W 30/085; B60W 2550/408; B60W 2050/143
See application file for complete search history.

(56) References Cited

U.S. PATENT DOCUMENTS

| | | | |
|---|---|---|---|
| 2001/0008992 A1 | 7/2001 | Saito et al. | |
| 2002/0198632 A1* | 12/2002 | Breed | B60N 2/2863 701/1 |
| 2008/0055114 A1* | 3/2008 | Kim | B60R 1/00 340/937 |
| 2009/0306880 A1* | 12/2009 | Gomi | G09B 9/052 701/117 |
| 2010/0106387 A1 | 4/2010 | Tsuchida | |
| 2012/0016627 A1 | 1/2012 | Nagura | |
| 2014/0142839 A1* | 5/2014 | Kaminade | G08G 1/166 701/301 |
| 2014/0229069 A1* | 8/2014 | Akiyama | B60T 7/12 701/41 |
| 2014/0236428 A1* | 8/2014 | Akiyama | G08G 1/165 701/42 |
| 2015/0151755 A1* | 6/2015 | Ohmori | B60T 7/22 701/93 |
| 2015/0153737 A1* | 6/2015 | Shiota | B60T 7/22 701/96 |
| 2016/0207534 A1* | 7/2016 | Nishimura | B60W 50/14 |
| 2017/0141861 A1* | 5/2017 | Zhang | H04H 20/55 |

FOREIGN PATENT DOCUMENTS

| | | |
|---|---|---|
| JP | 2008-230467 A | 10/2008 |
| JP | 2008308024 A | 12/2008 |
| JP | 2010-015450 | 1/2010 |
| JP | 2012022527 A | 2/2012 |
| JP | 2014-006609 A | 1/2014 |
| JP | 2014-241036 A | 12/2014 |

* cited by examiner

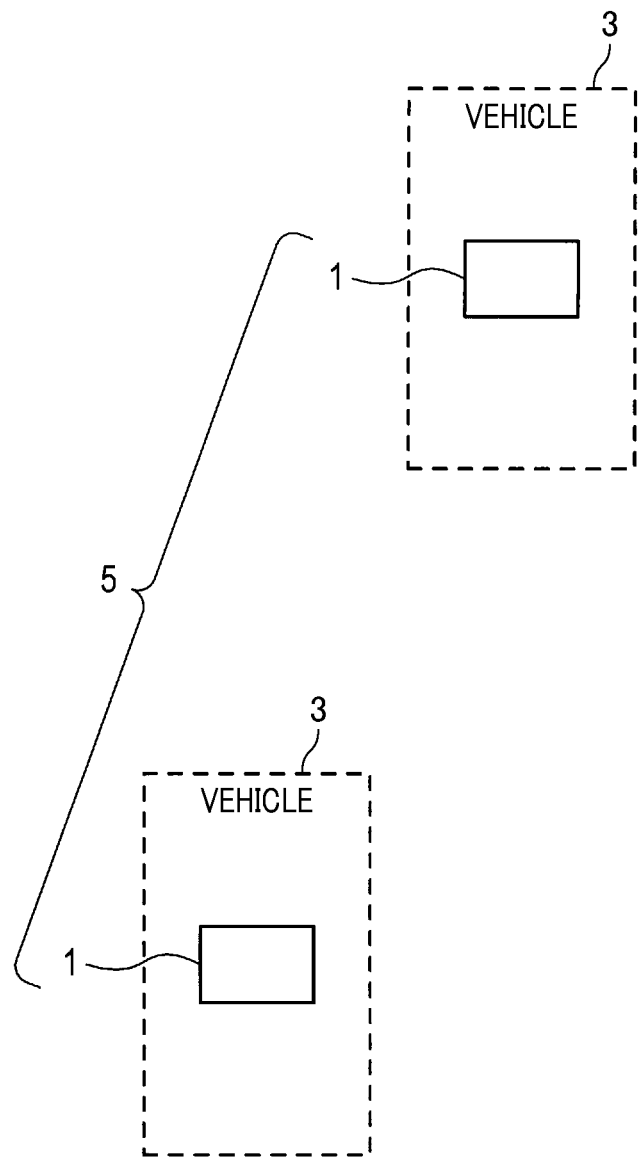

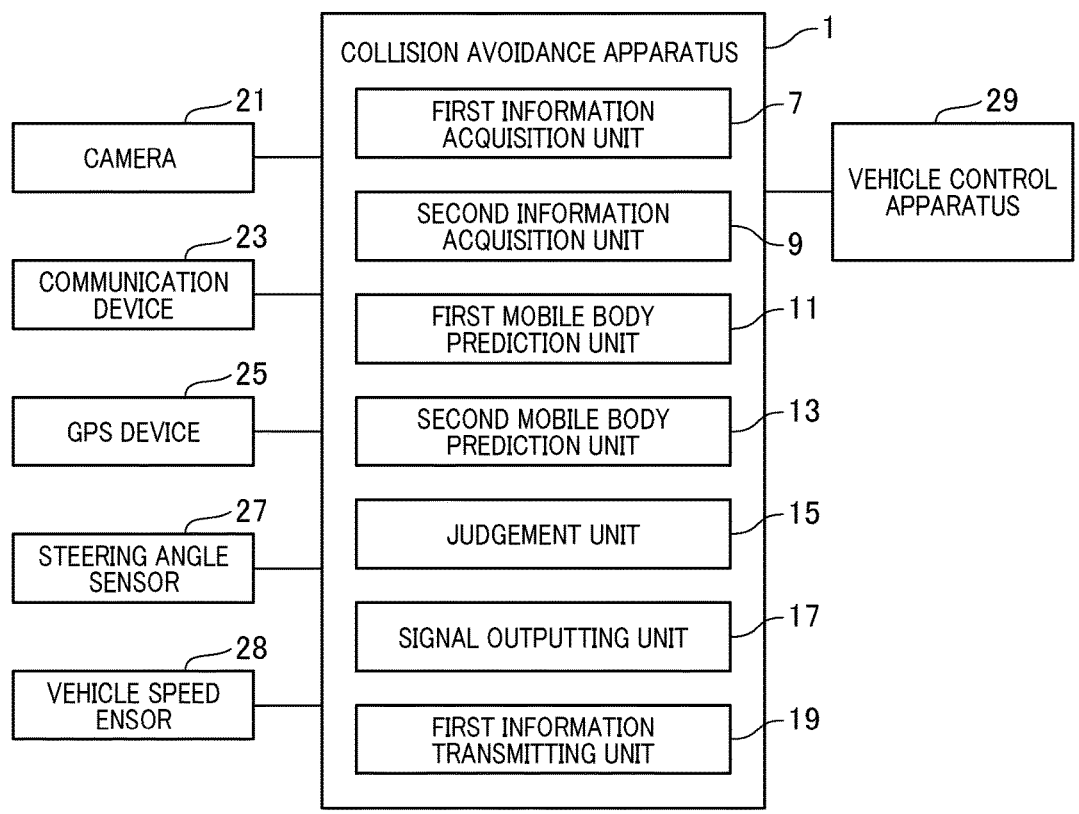
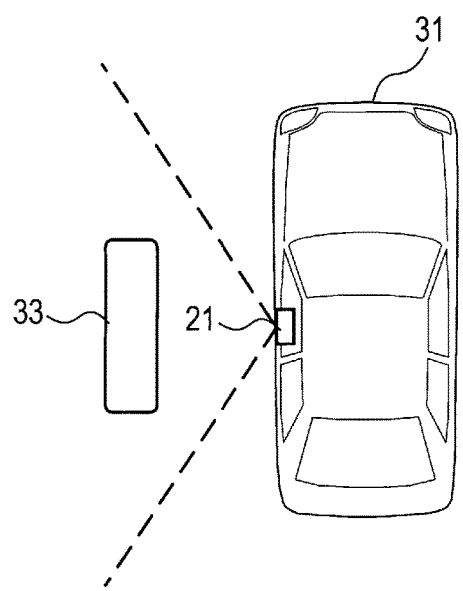

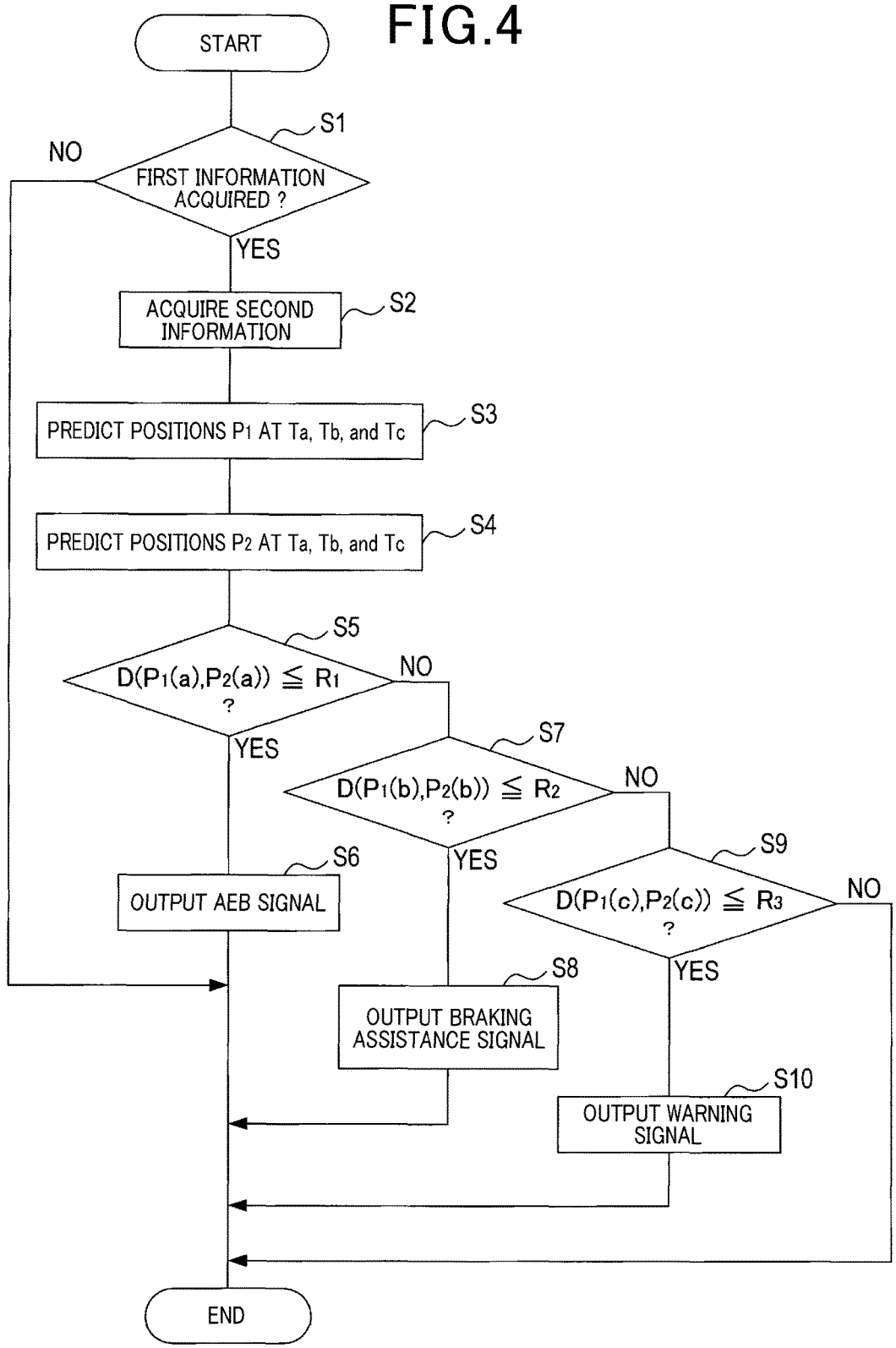

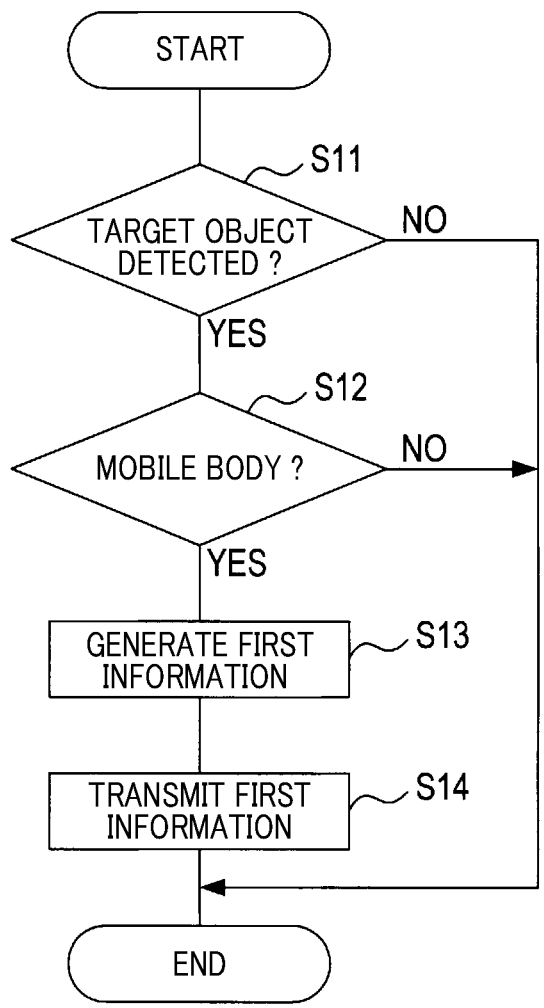

COLLISION AVOIDANCE APPARATUS, COLLISION AVOIDANCE SYSTEM, AND DRIVING SUPPORT METHOD

CROSS-REFERENCE TO RELATED APPLICATIONS

This application is based on and claims the benefit of priority from earlier Japanese Patent Application No. 2015-75828 filed on Apr. 2, 2015, the description of which is incorporated herein by reference.

TECHNICAL FIELD

The present invention relates to collision avoidance apparatus and a collision avoidance system.

BACKGROUND ART

Technology is known (see PTL 1) for detecting a mobile body (other vehicle, etc.) having a possibility of collision with a host vehicle, by using a sensor installed on the host vehicle.

CITATION LIST

Patent Literature

[PTL 1] JP-A-2008-308024

SUMMARY OF THE INVENTION

Technical Problem

However it is possible that a sensor installed on the host vehicle may be unable to quickly detect a mobile body having a possibility of collision with the host vehicle. For example it is difficult for a sensor installed on the host vehicle to detect an oncoming two wheeled vehicle that will pass by the side of the host vehicle, or to detect a two wheeled vehicle, etc., which is approaching from the rear of the host vehicle, to pass by the side of the host vehicle.

In view of that problem, it is an object of the present invention to provide a collision avoidance apparatus and a collision avoidance system which can reduce the danger of collision with a mobile body.

Solution to Problem

One form of the present invention is a collision avoidance apparatus. The collision avoidance apparatus consists of a first information acquisition unit, a second is information acquisition unit, a first mobile body prediction unit, a second mobile body prediction unit, a judgement unit, and a signal outputting unit. The first information acquisition unit generates first information which includes the position, speed and advancement direction of a first mobile body, and acquires first information from an information transmitting apparatus which has a transmitting function. The second information acquisition unit generates second information, which includes the position, speed and advancement direction of a second mobile body. The first mobile body prediction unit predicts positions that the first mobile body will reach at future time points T, based on the first information, while the second mobile body prediction unit predicts the positions that the second mobile body will reach at the future time points T, based on the second information. The judgement unit judges whether the positions of the first mobile body and the positions of the second mobile body satisfy predetermined conditions, and the signal outputting unit outputs a specific signal when the judgement unit judges that the predetermined conditions are satisfied.

With such a configuration of the collision avoidance apparatus, even if it is not possible for the collision avoidance apparatus to directly detect the first mobile body, the danger of collision between the first mobile body and second mobile body can be reduced.

Another form of the present invention is a collision avoidance system that includes the above collision avoidance apparatus and first information transmitting apparatus. With the collision avoidance system of the present invention, even if it is not possible for the collision avoidance apparatus to directly detect a first mobile body, the danger of collision between the first mobile body and a second mobile body can be reduced.

Other objectives, features and advantages will be made clear from the following detailed description of preferred embodiments, given with reference to the appended drawings.

BRIEF DESCRIPTION OF THE DRAWINGS

FIG. 1 is an explanatory diagram showing the configuration of an embodiment of a collision avoidance system according to the present invention;

FIG. 2 is a block diagram showing the configuration of an embodiment of a collision avoidance apparatus according to the present invention;

FIG. 3 is an explanatory diagram showing the arrangement of a camera in a host vehicle;

FIG. 4 is a flow diagram of judgement processing that is executed by the collision avoidance apparatus shown in FIG. 2;

FIG. 8 is a flow diagram showing first information processing that is executed by the collision avoidance apparatus of FIG. 2.

DESCRIPTION OF THE EMBODIMENTS

Figure 5:
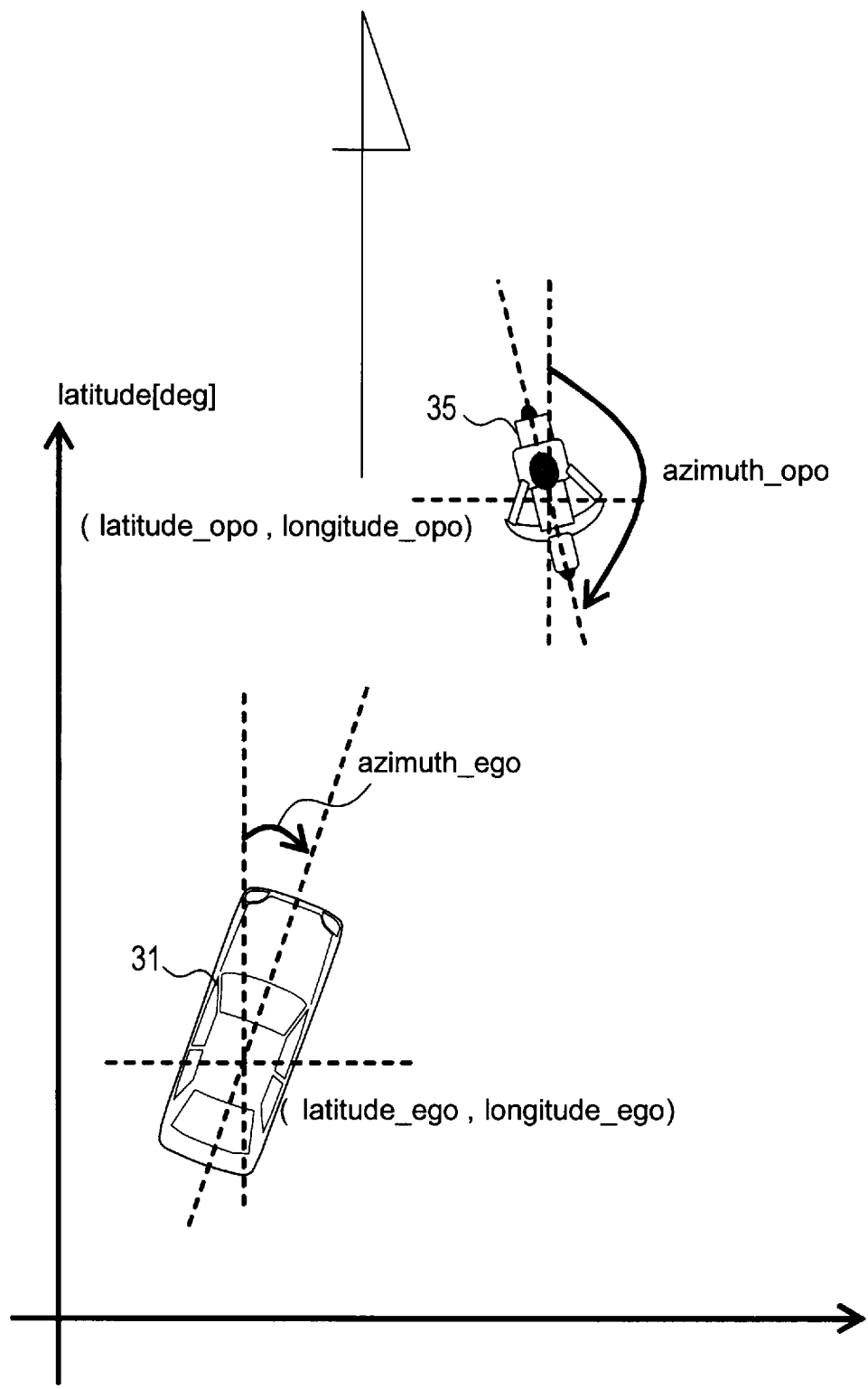
FIG. 5 is an explanatory diagram showing the position and advancement directions of a first mobile body and a host vehicle, expressed by latitude and longitude.
Figure 6:
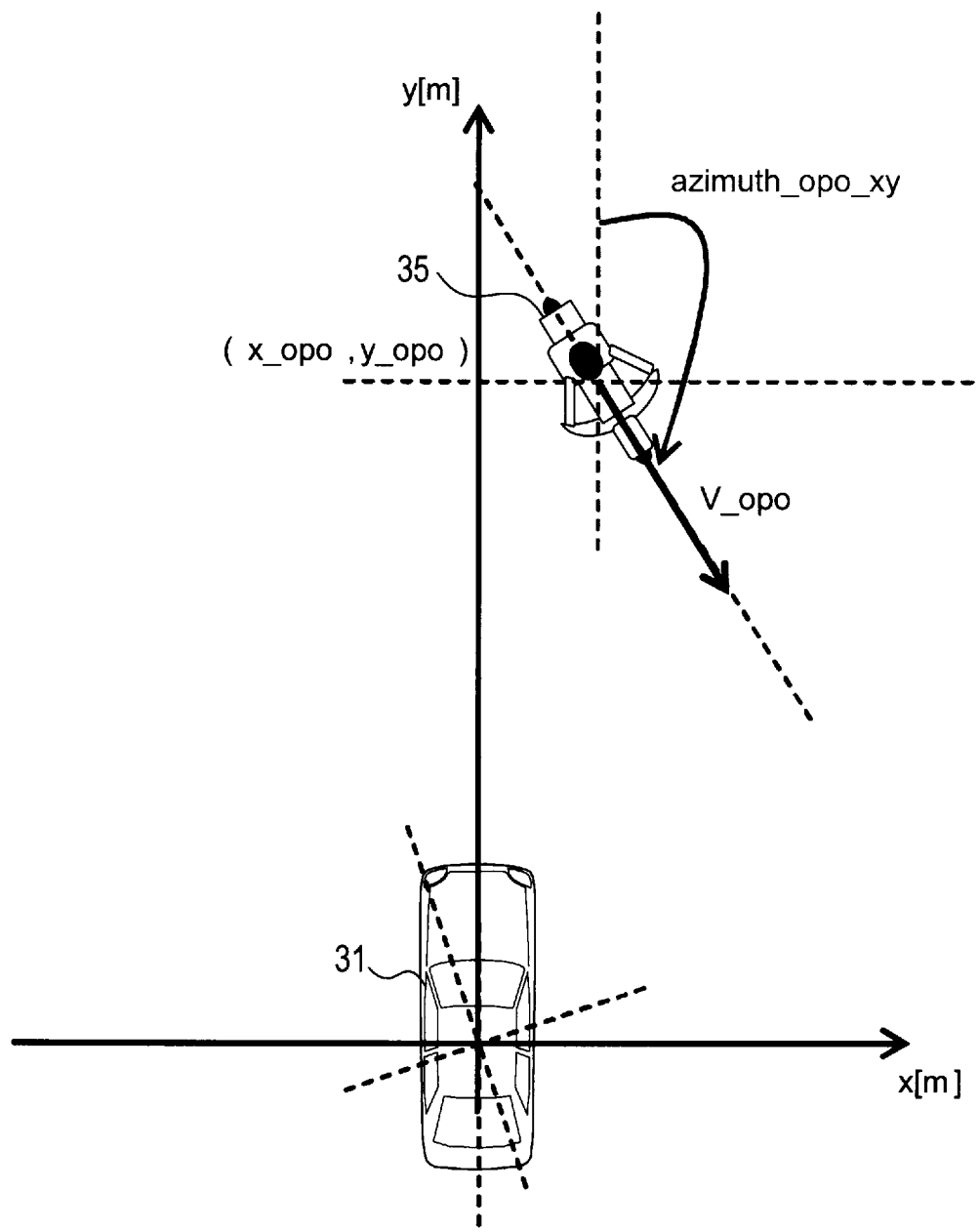
FIG. 6 is an explanatory diagram showing an xy coordinate system having the position of the host vehicle as origin and having the advancement direction of the host is vehicle as the y-axis.

Embodiments of the disclosure are described in detail in the following, referring to the appended drawings.

1. Collision Avoidance Apparatus and Collision Avoidance System

The configurations of embodiments of an image processing apparatus 1 and a collision avoidance system 5 according to the present invention will be described based on FIGS. 1-3. As shown in FIG. 1, the collision avoidance apparatus 1 is a vehicle-installed apparatus, mounted in a vehicle 3. A plurality of collision avoidance apparatuses 1 installed in a plurality of vehicles 3 constitute the collision avoidance system 5. A vehicle is an example of a mobile body. A collision avoidance apparatus 1, in addition to being a collision avoidance apparatus, is an example of a first information transmitting apparatus. That is to say, a collision avoidance apparatus 1 has a function of a first information transmitting apparatus.

Considering single one of the plurality of vehicles 3, the vehicle in which the collision avoidance apparatus 1 is installed will be referred to as the host vehicle in the following. The host vehicle is an example of a second mobile body. The collision avoidance apparatus 1 that is installed in the host vehicle is a known type of computer, equipped with a central processing unit (CPU), random access memory (RAM), read-only memory (ROM), etc. As shown in FIG. 2, the collision avoidance apparatus 1 has a plurality of function blocks, consisting of a first information acquisition unit 7, a second information acquisition unit 9, a first mobile body prediction unit 11, a second mobile body prediction unit 13, a judgement unit 15, a signal outputting unit 17 and an information transmitting unit 19. The functions of these units are described hereinafter.

In addition to the collision avoidance apparatus 1, the host vehicle is equipped with a camera 21, a communication device 23, a GPS device 25, a steering angle sensor 27, a so vehicle speed sensor 28 and a vehicle control apparatus 29. The camera 21 captures images of the surroundings of the host vehicle. As shown in FIG. 3, the camera 21 is mounted on the left side of the host vehicle 31, and can image a target object 33 that is to the left of the host vehicle 31 (for example a two wheeled vehicle that will pass by the side of the host vehicle 31 ).

The communication device 23 performs a communication function, executing wireless communication between the host vehicle and collision avoidance apparatuses 1 installed on other vehicles. The GPS device 25 obtains the position of the host vehicle. The steering angle sensor 27 detects the steering angle of the host vehicle. The vehicle control apparatus 29 executes collision avoidance processing in accordance with signals (described hereinafter) that are outputted from the collision avoidance apparatus 1. The collision avoidance processing includes autonomous emergency braking (AEB), braking assistance and providing warning indications to the driver of the host vehicle.

2. Judgement Processing Executed by the Collision Avoidance Apparatus

The collision avoidance apparatus 1 executes judgement processing repetitively at predetermined intervals, as will be described based on FIGS. 4-7.

In step S1 of FIG. 4, the first information acquisition unit 7 judges whether or not the communication device 23 is able to receive first information. That first information is information that is generated and transmitted by the collision avoidance apparatus 1 of a vehicle other than the host vehicle. The first information includes the position, speed, advancement direction of a mobile body (referred to in the following as the first mobile body) that is detected by the collision avoidance apparatus 1 of the vehicle other than the host vehicle, and the time point (referred to in the following as the first time point) at which the first information was generated.

In the first information, the position of the first mobile body is specified by the latitude (latitude_opo) of the first mobile body and the longitude (longitude_opo) of the first mobile body. Furthermore in the first information, the advancement direction of the first mobile body is specified by the azimuth angle (azimuth_opo) of the first mobile body, with north as a reference.

If it is judged that the first information has been received, operation proceeds to step S2, while if it is judged that the information has not been received, this processing is then ended.

In step S2, the second information acquisition unit 9 obtains second information. The second information includes the position, speed, and advancement direction of the host vehicle, the time point (referred to in the following as the second time point) at which the second information was obtained, and the steering angle δ of the host vehicle.

The second information acquisition unit 9 obtains the position and advancement direction of the host vehicle by using the GPS device 25. In the second information, the position of the host vehicle is specified by the latitude (latitude_ego) and longitude (longitude_ego) of the host vehicle. Furthermore, in the second information, the advancement direction of the host vehicle is specified by the azimuth angle (azimuth_ego) of the host vehicle, with north as reference. The second information acquisition unit 9 acquires the speed V by using the vehicle speed sensor 28. The second information acquisition unit 9 obtains the steering angle δ by using the steering angle sensor 27.

In step S3, the first mobile body prediction unit 11 predicts the positions $P_1$ of the first mobile body at future time points Ta, Tb, Tc, based on the first information that was judged in step S1 to have been received. Here, Tb is a time point which is after Ta and Tc is a time point which is after Tb. In the following, the position of the first mobile body at time point Ta is designated as $P_1$ (a), the position of the first mobile body at time point Tb is designated as $P_1$ (b),and the position of the first mobile body at time point Tc is designated as $P_1$ (c).Furthermore in the following, the time points $P_1$ (a), $P_1$ (b), $P_1$ (c) are collectively designated as $P_1$, and Ta, Tb, Tc are collectively designated as T.

The first mobile body prediction unit 11 predicts $P_1$ (a), $P_1$ (b), $P_1$ (c) by the following method.

Firstly, the position and advancement direction (see FIG. 5) of the first moving body 35 expressed by the latitude and the longitude are converted to values in an xy coordinate so system (see FIG. 6) having the position of the host vehicle 31 as origin, and having the advancement direction of the host vehicle 31 as the y axis.

The difference (lati_diff) between the latitude of the first mobile body and the latitude of the host vehicle is calculated using equation (1). In addition the difference (longi_diff) between the longitude of the first mobile body and the longitude of the host vehicle is calculated using equation (2).

$$(\text{lati\_diff}) = (\text{latitude\_opo} - \text{latitude\_ego}) \qquad [\text{Math. 1}]$$

$$(\text{longi\_diff}) = (\text{longitude\_opo} - \text{longitude\_ego}) \qquad [\text{Math. 2}]$$

Next, the difference in latitude is converted to a distance (x_diff). In addition, the difference in longitude is converted to a distance (y_diff).

$$\text{x\_diff} = 1852 \times 60 \times \text{longi\_diff} \times \cos(\text{lati\_diff}) \qquad [\text{Math. 3}]$$

$$\text{y\_diff} = 1852 \times 60 \times \text{lati\_}_{\textit{diff}} \qquad [\text{Math. 4}]$$

The x-coordinate (x_opo) of the first mobile body in the xy coordinate system at the first time point can be expressed by equation 5, and the y-coordinate (y_opo) by equation 6.

$$\text{x\_opo} = \text{x\_diff} \times \cos(-\text{azimuth\_ego}) - \text{y\_diff} \times \sin(-\text{azimuth\_ego}) \qquad [\text{Math. 5}]$$

$$\text{y\_opo} = \text{y\_diff} \times \cos(-\text{azimuth\_ego}) - \text{y\_diff} \times \sin(-\text{azimuth\_ego}) \qquad [\text{Math. 6}]$$

The advancement direction (azimuth_opo_xy) of the first mobile body with respect to the xy coordinate system can be expressed by equation 7.

$$\text{azimuth\_opo\_xy} = \text{azimuth\_opo} - \text{azimuth\_ego} \quad [\text{Math. 7}]$$

The x-coordinate (xA_opo) of the first mobile body in the xy coordinate system after A seconds have elapsed following the first time point can be expressed by equation 8, and the y-coordinate(yA_opo) by equation 9.

$$xA\_opo = x\_opo + V\_opo \times A \times \sin(\text{azimuth\_opo\_xy}) \quad [\text{Math. 8}]$$

$$yA\_opo = y\_opo + V\_opo \times A \times \cos(\text{azimuth\_opo\_xy}) \quad [\text{Math. 9}]$$

$P_1$ (a) can be obtained by replacing A in equations 8 and 9 by the time difference between the first time point and the time point Ta. Furthermore $P_1$ (b) can be obtained by replacing A in equations 8 and 9 by the time difference between the first time point and the time point Tb. Moreover $P_1$ (c) can be obtained by replacing A in equations 8 and 9 by the time difference between the first so time point and the time point Tc.

The above method of calculating $P_1$ (a), $P_1$ (b), $P_1$ (c) is one example of a method of predicting $P_1$ (a), $P_1$ (b), $P_1$ (c) using the first time point.

In step S4, the second mobile body prediction unit 13 predicts the positions $P_2$ that will be attained by the host vehicle at the time points Ta, Tb, Tc, based on the second information that was obtained in step S2. In the following, the predicted position of the host vehicle at time point Ta is designated as $P_2$, the predicted position of the host vehicle at time point Tb is designated as $P_2$ (b), and the predicted position of the host vehicle at time point Tc is designated as $P_2$ (C). $P_2$ (a), $P_2$ (b), $P_2$ (c) are collectively designated as $P_2$.

The second mobile body prediction unit 13 predicts $P_2$ (a), $P_2$ (b), $P_2$ (C) by using the following method. Firstly, using the speed V and the steering angle $\delta$ contained in the second information, the body slip angle $\beta$ is calculated from equation 10, and the yaw rate y is calculated from equation 11.

$$\beta = \frac{1 - \frac{m}{2l} \frac{l_f}{l_r K_r} V^2}{1 + AV^2} \frac{l_r}{l} \delta \quad [\text{Math. 10}]$$

$$\gamma = \frac{1}{1 + AV^2} \frac{V}{l} \delta \quad [\text{Math. 11}]$$

In equations 10 and 11, m is the weight of the host vehicle, I is the wheelbase of the host vehicle, $I_r$ is the distance from the center of gravity of the host vehicle to the center of the front wheels, $I_r$ is the distance from the center of gravity of the host vehicle to the center of the rear wheels, $K_r$ is the rear wheel cornering power, and A is a stability factor that is expressed by equation 12. $K_r$ in equation 12 is the front wheel cornering power.

$$A = -\frac{m}{2l^2} \frac{l_f K_f - l_r K_r}{K_f K_r} \quad [\text{Math. 12}]$$

Next, the yaw angle $\phi$ is calculated from equation 13.

$$\phi = V \int \gamma \, dt \quad [\text{Math. 13}]$$

The x-coordinate of the host vehicle after t seconds have elapsed following the second time point is expressed by equation 14, and the y-coordinate of the host vehicle after t seconds have elapsed following the second time point is expressed by equation 15.

$$x = V \int_0^t \cos(\beta + \phi) \, dt \quad [\text{Math. 14}]$$

$$y = V \int_0^t \sin(\beta + \phi) \, dt \quad [\text{Math. 15}]$$

$P_2$ (a) canoe obtained by inserting values of body slip angle $\beta$ and yaw angle $\phi$ calculated as described above into the equations 14 and 15, while also inserting the time difference between the second time point and Ta as the value of t.

Furthermore, $P_2$ (b) can be obtained by inserting values of body slip angle $\beta$ and yaw angle $\phi$ calculated as described above into the equations 14 and 15, while also inserting the time difference between the second time point and Tb as the value of t.

Furthermore, $P_2$ (c) can be obtained by inserting values of body slip angle $\beta$ and yaw angle $\phi$ calculated as described above into the equations 14 and 15, while also inserting the time difference between the second time point and Tc as the value of t.

The above method of calculating $P_2$ (a), $P_2$ (b), $P_2$ (c) is one example of a method of predicting $P_2$ (a), $P_2$ (b), $P_2$ (c) using the second time point.

In step S5, a decision is made as to whether the distance (designated in the following as $D(P_1$ (a), $P_2$ (a between $P_1$ (a) that was predicted in step S3 and $P_2$ (a) that was predicted in step S4 satisfies the condition of being less than the threshold value $R_1$. If $D(P_1$ (a), $P_2$ (a)) is less than the threshold value $R_1$, operation then proceeds to S6, while otherwise, operation proceeds to step S7.

In step S6, the signal outputting unit 17 outputs the AEB signal. When the vehicle control apparatus 29 receives the AEB signal, it executes automatic braking processing. The AEB signal is one example of a specific signal that is produced when there is a positive decision in step S5.

If there is a negative decision in step S5, operation proceeds to step S7, in which a decision is made as to whether the distance $D(P_1$ (b), $P_2$ (b)) between $P_1$ (b) that was predicted in step S3 and $P_2$ (b) that was predicted in step S4 satisfies the condition of being less than the threshold value $R_2$, having a higher value than $R_1$. If $D(P_1$ (b), $P_2$ (b)) is less than the threshold value $R_2$, operation then proceeds to S8, while otherwise, operation proceeds to step S9.

In step S8, the signal outputting unit 17 outputs the braking assistance signal. When the vehicle control apparatus 29 receives the braking assistance signal, it executes braking assistance processing. The braking assistance signal is one example of a specific signal that is produced when there is a positive decision in step S7.

If there is a negative decision in step S7, operation proceeds to step S9, in which a decision is made as to whether the distance $D(P_1$ (c), $P_2$ (c)) between $P_1$ (c) that was predicted in step S3 and $P_2$ (c) that was predicted in step S4 satisfies the condition of being less than the threshold value $R_3$, having a higher value than $R_2$. If $D(P_1$ (c), $P_2$ (c)) is less than the threshold value $R_3$, operation then proceeds to S10, while otherwise, this processing is ended.

In step S10, the signal outputting unit 17 outputs the warning signal. When the vehicle control apparatus 29 receives the warning signal, it executes warning processing. The warning signal is one example of a specific signal that is produced when there is a positive decision in step S9.

Figure 7:
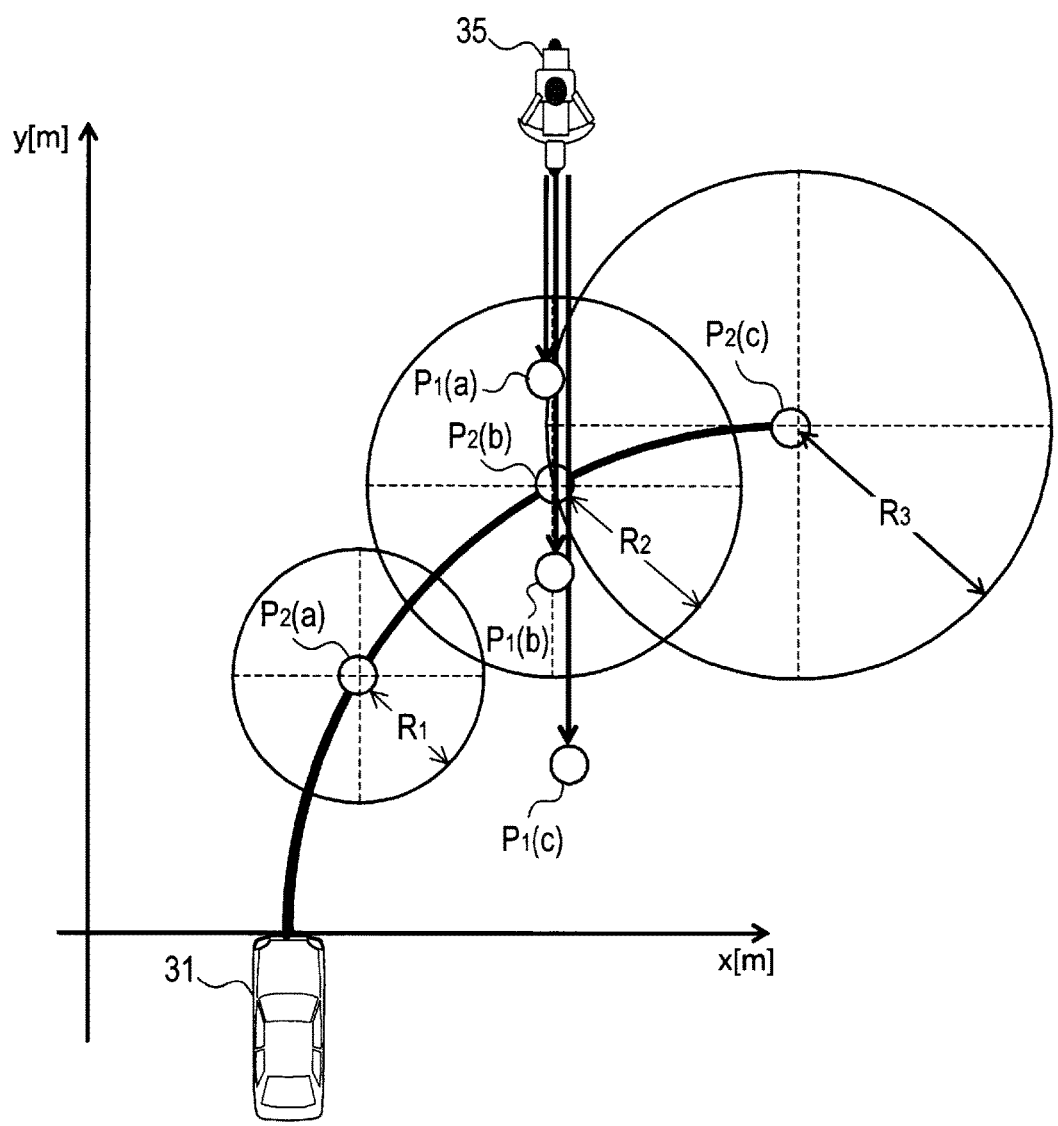
FIG. 7 is an explanatory diagram showing an example of executing judgement processing.

FIG. 7 shown an example of executing the above judgement processing. Since $D(P_1$ (a), $P_2$ (a)) is greater than $R_1$ in this example, there is a negative decision in step S5. Furthermore since D(P$_1$ (b), P$_2$ b)) is less than R$_2$, there is a positive decision in step S7, and the braking assistance signal is outputted. In this example, D(P$_1$ (c), P$_2$ (c)) is greater than R$_3$.

3. First Information Transmitting Processing Executed by the Collision Avoidance Apparatus First information transmitting processing that is executed repetitively at predetermined intervals by the collision avoidance apparatus 1, and in particular by the information transmitting unit 19, will be described based on FIG. 8.

In step S11, an image is captured using the camera 21. A known type of image recognition is applied to that image, for judging whether or not a target object (for example another vehicle, including two wheeled vehicles, a pedestrian, etc.) can be detected. If a target object is detected, operation then proceeds to step S12, while if no target object is detected, this processing is ended.

In step S12 a decision is made as to whether the target object that was detected in step S11 is a mobile body. A mobile body is a target object that is in motion relative to the road. If the position of the target object with respect to the road does not change, and the relative speed of the target object detected in step S11 is not 0, then it is judged that the target object detected in step S11 is a mobile body, and operation then proceeds to step S13. On the other hand if the relative speed is 0 then it is judged that the target object detected in step S11 is not a mobile body, and this processing is ended.

In step S13, first information is generated with respect to the target object (mobile body) detected in step S11. In this case, the target object that was detected in step S11 is designated as the first target object.

As described above, the first information includes the position, speed and directionof the first mobile body, and the first time point. The position of the first mobile body can be calculated from the position of the host vehicle, the distance from the host vehicle to the first mobile body, and the direction of the first mobile body with reference to the host vehicle. The position of the host vehicle can be so obtained by using the GPS device 25. The distance from the host vehicle to the first mobile body, and the direction of the first mobile body with reference to the host vehicle, can be estimated from the position and the size of the first mobile body in the images captured by the camera 21. The speed and the advancement direction of the first mobile body can be calculated from changes in the position of the first mobile body as time elapses. The first time point is the time point at which step S13 was executed.

In step S14, the first information that was generated in step S11 is transmitted, using the communication device 23. The transmitted first information is received and used in judgement processing by vehiclesother than the host vehicle.

4. Advantages (1A) The collision avoidance apparatus 1 installed in the host vehicle obtains first information from other collision avoidance apparatuses 1, together with obtaining second information which relates to the host vehicle. Furthermore the collision avoidance apparatus 1 predicts the positions P$_1$ (a), P$_1$ (b), P$_1$ (c) of a first mobile body at future time points Ta, Tb, Tc based on the first information, together with predicting the positions P$_2$ (a), P$_2$ (b), P$_2$ (c) of a second mobile body at the future time points Ta, Tb, Tc based on the second information.

Furthermore when D(P$_1$ (a), P$_2$ (a)) is less than R$_1$, an AEB signal is outputted, and when D(P$_1$ (b), P$_2$ (b)) is less than R$_2$, a braking assistance signal is outputted, while so when D(P$_1$ (c), P$_2$ (c)) is less than R$_3$, a warning signal is outputted. In that way, even if a sensor installed on the host vehicle is unable to directly detect the first mobile body, the danger of collision between the first mobile body and the host vehicle can be reduced.

[1B] The collision avoidance apparatus 1 judges whether or not a condition is satisfied whereby the distance between position P$_1$ and position P$_2$ is less than a threshold value, and outputs a collision avoidance-use signal (AEB signal, braking assistance signal, warning signal) in accordance with the judgement results. In that way, judgement as to whether or not collision avoidance-use signal is to be outputted can be readily performed.

[1C] The first information includes a first time point and a second time point. The collision avoidance apparatus 1 predicts the position P$_1$ by using the first information, and predicts the position P$_2$ by using the second information. In that way, position P$_1$ and position P$_2$ can be accurately predicted.

[1D] The collision avoidance apparatus 1 predicts positions P$_1$ and position P$_2$ at each of a plurality of time points Ta, Tb, Tc, and judges whether or not the position P$_1$ and position P$_2$ satisfy a predetermined condition at each of the plurality of time points Ta, Tb, Tc. In that way the danger of collision between the first mobile body and the host vehicle can be further reduced.

[1E] Collision avoidance apparatuses 1 are vehicle-mounted apparatuses, installed on vehicles. Due to that fact, a collision avoidance apparatus 1 can reduce the danger of collision between a first mobile body and the vehicle on which the collision avoidance apparatus 1 is installed.

[1F] When a first mobile body is detected, a collision avoidance apparatus 1 can generate and transmit first information. Another collision avoidance apparatus 1 can receive that first information, and execute judgement to processing. For that reason, even if a vehicle having a collision avoidance apparatus 1 installed is unable to directly detect a first mobile body, the danger of collision between that vehicle and the first mobile body can be reduced.

[1F] When a collision avoidance apparatus 1 detects a first mobile body, it can generate and transmit first information. Another collision avoidance apparatus 1 can receive that first information, and perform judgement processing. For that reason, even if a vehicle having a collision avoidance apparatus 1 installed is unable to directly detect a first mobile body, the danger of collision between the first mobile body and the vehicle can be reduced.

[1G] A collision avoidance apparatus 1 is installed on a vehicle. For that reason, for example, a mobile body (such as a two wheeled vehicle) that will pass by the side of the first-mentioned vehicle can be detected, and information relating to that mobile body can be generated.

(Other Embodiments)

Although the present invention has been described with respect to specific embodiments, the invention is not limited to these embodiments, and various forms may be adopted.

(1) It would be equally possible to use other conditions as conditions which are judged in steps S5, S7, S9 as to whether or not they are satisfied. For example in FIG. 7, it would be equally possible to assume an ellipse having position P$_2$ at its center, and to use a condition that the position P$_1$ must be within that ellipse. Furthermore in FIG. 7, it would be equally possible to assume an ellipse having position P$_1$ at its center, and to use a condition that the position P$_2$ must be within that ellipse.

(2) It would be equally possible to omit the first time point from the first information. In that case, with respect to the step S3, the position P$_1$ can be obtained by substituting, for A in equations 8 and 9, the time that has elapsed since the time point of executing step S3.

Furthermore, it would be equally possible to omit the second time point from the second information. In that case, with respect to the step S4, the position $P_2$ can be obtained by substituting the time that has elapsed since the time point of executing step S3, for t in equations 14 and 15.

(3) It would be equally possible to omit installing on the vehicle of a part of the collision avoidance apparatus 1, o in the configuration of the collision avoidance system 5. The part of the collision avoidance apparatus 1 that is omitted may be a roadside apparatus that is installed on the roadside.

(4) It would be equally possible to omit the steering angle δ from the second information. In that case, $P_2$ could be predicted by assuming that the host vehicle will continue to advance along the same direction as the advancement direction at the time point when the first information was generated.

(5) It would be equally possible for the host vehicle to be equipped with another sensor (for example a millimeter-wave sensor, a laser radar, etc.) to replace or to augment the camera 21.

(6) It would be equally possible for a part of a collision avoidance apparatus 1, in the collision avoidance system 5, to generate and transmit the first information as a specialized function. That is to say, the function of executing judgement processing could be omitted from that part of the collision avoidance apparatus 1. Equipment having the specialized function of generating and transmitting the first information could be provided as a vehicle-installed apparatus, or as a roadside apparatus that is installed by the roadside. Moreover in the configuration of the collision avoidance system 5 it would be equally possible to omit, from each collision avoidance apparatus 1, a part having the functions of generating and transmitting the first information.

(7) It would be equally possible to provide a data center in the collision avoidance system 5. That data center would receive the ID and first information of one collision avoidance apparatus 1 from that collision avoidance apparatus 1, and would receive the ID and second information of another collision avoidance apparatus 1 from that other collision avoidance apparatus 1. The data center would then execute judgement processing as for the first embodiment above. Moreover, the data center would transmit, to its surroundings, information (referred to in the following as data center information) that includes the results of the judgement processing, and the IDs of the collision avoidance apparatuses 1 that were the transmission sources of the first information and second information. A collision avoidance apparatus 1 that was a transmission source of the first information and second information could acquire the data center information, using the IDs, and make use of the judgement processing results that are contained in the data center information. Such a collision avoidance system 5 would enable the processing load on each collision avoidance apparatus 1 to be reduced. The above data center is one example of a collision avoidance apparatus.

(8) It would be equally possible for the values of $R_1$, $R_2$ and to be identical.

(9) It would be equally possible for the functions of the above embodiments to be dispersed among a plurality of constituent elements having respective functions, or for the functions of a plurality of constituent elements to be integrated into a single constituent element. Moreover, it would be equally possible for at least a part of the configuration of the above embodiments to be replaced by a known configuration having a similar function. Furthermore it would be equally possible to omit a part of the configuration of the above embodiments. Moreover, it would be equally possible to replace or augment a part of the configuration of an above embodiment with part of another embodiment. All aspects contained in the technical concepts specified by the wording in the claims are embodiments of the present invention,

(10) Apart from the above embodiments, the present invention may be realized as a collision avoidance apparatus in various forms, including a program that is executed by a computer, a medium which stores the program, a collision avoidance method, etc.

The invention claimed is:

1. A collision avoidance apparatus comprising:
   a first information acquisition unit configured to acquire first information including a position, a speed, and an advancement direction of a first mobile body from a first information transmitting apparatus that is configured to generate and transmit the first information;
   a second information acquisition unit configured to acquire second information including a position, a speed, and an advancement direction of a second mobile body;
   a first mobile body prediction unit configured to predict a position of the first mobile body at an at least one future time point, based on the first information;
   a second mobile body prediction unit configured to predict a position of the second mobile body at the at least one future time point, based on the second information;
   a judgement unit configured to judge whether or not the position of the first mobile body at the at least one future time point and the position of the second mobile body at the at least one future time point satisfy a predetermined condition; and
   a signal outputting unit configured to, in response to the judgement unit judging that the predetermined condition is satisfied, output a signal which is specific to the predetermined condition,
   wherein the second mobile body is a vehicle,
   the collision avoidance apparatus is installed on the second mobile body, and
   the first information transmitting apparatus is installed on a vehicle that is a mobile body other than the first and second mobile bodies, or installed on roadside equipment installed on a roadside.

2. The collision avoidance apparatus according to claim 1, wherein the predetermined condition is satisfied in response to a distance between the position of the first mobile body and the position of the second mobile body being less than a predetermined threshold value.

3. The collision avoidance apparatus according to claim 1, wherein
   the first information includes a first time point that is a time point at which the first information was generated,
   the second information includes a second time point that is a time point at which the second information was generated,
   the first mobile body prediction unit predicts the position of the first mobile body by using the first time point, and
   the second mobile body prediction unit predicts the position of the second mobile body by using the second time point.

4. The collision avoidance apparatus according to claim 1, wherein
   the first mobile body prediction unit predicts the position of the first mobile body at a respective one of a plurality of the at least one future time points, the second body prediction unit predicts that will be attained by the second mobile body at a respective one of the plurality of the at least one future time points, and the judgement unit judges whether or not the position of the first mobile body and the position of the second mobile body satisfy the predetermined condition at a respective one of the plurality of the at least one future time points.

5. A collision avoidance system comprising:

a first information transmitting apparatus configured to generate and transmit first information including a position, a speed, and an advancement direction of a first mobile body; and a collision avoidance apparatus comprising:
- a first information acquisition unit configured to acquire the first information from the first information transmitting apparatus;
- a second information acquisition unit configured to acquire second information including a position, a speed, and an advancement direction of a second mobile body;
- a first mobile body prediction unit configured to predict a position of the first mobile body at an at least one future time point, based on the first information;
- a second mobile body prediction unit configured to predict a position of the second mobile body at the at least one future time point, based on the second information;
- a judgement unit configured to judge whether or not the position of the first mobile body at the at least one future time point and the position of the second mobile body at the at least one future time point satisfy a predetermined condition; and
- a signal outputting unit configured to, in response to judgement unit judging that the predetermined condition is satisfied, output a signal which is specific to the predetermined condition, wherein the second mobile body is a vehicle, the collision avoidance apparatus is installed on the second mobile body, and the first information transmitting apparatus is installed on a vehicle that is a mobile body other than the first and second mobile bodies, or installed on roadside equipment installed on a roadside.

6. The collision avoidance apparatus according to claim 4, wherein the signal is a warning operation signal or a collision avoidance control operation signal, the at least one future time point includes a plurality of future time points, the plurality of time points include a first time point and a second time point that is subsequent to the first time point, and the signal outputting unit is configured to, in response to the judgement unit judging that the predetermined condition is satisfied with respect to the first future time point, output the collision avoidance control operation signal, and in response to the judgement unit judging that the predetermined condition is satisfied with respect to the second future time point, output the warning operation signal.

7. The collision avoidance apparatus according to claim 1, wherein the second information further includes a steering state or a turning state of the second mobile body, and the second mobile body prediction unit predicts the position of the second mobile body at the at least one future time point based upon not only the position, the speed, and the advancement direction of the second mobile body, but also the steering state or the turning state of the second mobile body.

8. A driving support method of supporting execution of a right turn or a left turn of a host vehicle by a driver, comprising:
- a first step of setting a predicted advancement track line in response to the host vehicle making a right turn or a left turn from a current position,
- a second step of setting a plurality of respectively different regions that are disposed along the predicted advancement track line,
- a third step of judging, based on information about a mobile body that is obtained through inter-vehicle communication or through roadside-to-vehicle communication, whether or not there is the mobile body for which there is a possibility that the mobile body will intrude into one of the plurality of different regions at a time point when the host vehicle is positioned in the one of the plurality of different regions, and
- a fourth step of executing driving support control that has been respectively set for the plurality of different regions, in response to judging in the third step that there is a mobile body having a possibility of intruding into the one of the plurality of different regions.

9. The driving support method according to claim 8, wherein for at least two of the plurality of different regions that are set in the second step, the closer a region is to the current position, the smaller the region becomes.

10. The driving support method according to claim 8, wherein at least one of the plurality of different regions that are set in the second step is a circular region, having a center point that is on the predicted advancement track line.

11. The driving support method according to claim 8, wherein a decision is made as to whether or not the presence of a mobile body other than the host vehicle is detected, and wherein the first step is executed in response to the presence of a mobile body other than the host vehicle being detected.

* * * * *